(12) United States Patent
Schmidt et al.

(10) Patent No.: US 9,225,613 B2
(45) Date of Patent: Dec. 29, 2015

(54) METHOD FOR ACCESSING CONTENT IN NETWORKS AND A CORRESPONDING SYSTEM

(75) Inventors: Mischa Schmidt, Heidelberg (DE); Martin Stiemerling, Leimen (DE)

(73) Assignee: NEC EUROPE LTD., Heidelberg (DE)

( * ) Notice: Subject to any disclaimer, the term of this patent is extended or adjusted under 35 U.S.C. 154(b) by 252 days.

(21) Appl. No.: 13/881,328

(22) PCT Filed: Jul. 7, 2011

(86) PCT No.: PCT/EP2011/003377
§ 371 (c)(1),
(2), (4) Date: Apr. 24, 2013

(87) PCT Pub. No.: WO2012/062382
PCT Pub. Date: May 18, 2012

(65) Prior Publication Data
US 2013/0227141 A1 Aug. 29, 2013

(30) Foreign Application Priority Data
Nov. 10, 2010 (EP) .................................. 10014441

(51) Int. Cl.
G06F 15/173 (2006.01)
H04L 12/24 (2006.01)
H04L 29/12 (2006.01)

(52) U.S. Cl.
CPC .......... *H04L 41/50* (2013.01); *H04L 29/12066* (2013.01); *H04L 29/1282* (2013.01); *H04L 61/1511* (2013.01); *H04L 61/6013* (2013.01); *H04L 61/609* (2013.01)

(58) Field of Classification Search
USPC .................................................. 709/225, 241
See application file for complete search history.

(56) References Cited

U.S. PATENT DOCUMENTS

2011/0296053 A1* 12/2011 Medved et al. ............... 709/241

OTHER PUBLICATIONS

Seedorf—Traffic Localization for P2P-Application: The ALTO Approach, Sep. 2009.*
International Search Report dated Oct. 28, 2011 in corresponding PCT application.
Seedorf J et al: "Traffic localization for P2P-applications: The ALTO approach", Peer-to-Peer Computing, 2009. P2P '09. IEEE Ninth International Conference on, IEEE, Piscataway, NJ, USA, Sep. 9, 2009, pp. 171-177, abstract Chapters I & III.

(Continued)

*Primary Examiner* — Kyung H Shin
(74) *Attorney, Agent, or Firm* — Young & Thompson

(57) ABSTRACT

A method for accessing content in networks, preferably in wide area networks, includes: determining a resource for content by a resource identifier; sending a DNS-query for resolving an IP-address for a host identifier specified as a part of the resource identifier by a client; determining a preferred hosting server hosting the content according to the resource identifier; sending a DNS-response including the IP-address of the determined hosting server to the client; accessing the content from the determined hosting server by the client by providing at least one hosting server identifier or one IP-address corresponding to the resource identifier to a sorting server; sorting the at least one hosting server identifier or IP-address by the sorting server according to client specific information or according to network guiding information provided by the client, determining a preferred hosting server according to the sorted at least one hosting server identifier or IP-address.

18 Claims, 2 Drawing Sheets

Enhanced ALTO concept for CDN

(56) References Cited

OTHER PUBLICATIONS

Penno S Raghunath J Medved Juniper Networks R Alimi Google R Yang Yale University S Previdi Cisco Systems R: "ALTO and Content Delivery Networks; draft-penno-alto-cdn-02.txt", ALTO and Content Delivery Networks; Draft-Penno-ALTO-CDN-02.txt, Internet Engineering Task Force, IETF; Standardworkingdraft, Internet Society (ISOC) 4, Rue Des Falaises CH-1205 Geneva, Switzerland, No. 2, Oct. 26, 2010. pp. 1-21.

Contavalli W Van Der Gaast Google S Leach Name Com D Rodden Neustar C: "Client IP information in DNS requests; draft-vandergaast-edns-client-ip-01.txt", Client IP Information in DNS Requests; Draft-Vandergaast-EDNS-Client-IP-01.txt, Internet Engineering Task Force. IETF; Standardworkingdraft, Internet Society (ISOC) 4. Rue Des Falaises CH-1205 Geneva. Switzerland. No. 1, May 21, 2010. pp. 1-23.

Akonjang A Feldmann DT Labsttu Berlin S Previdi B Davie Cisco Systems 0 et al: "The PROXIDOR Service; draft-akonjang-alto-proxidor-OO.txt". The Proxidor Service; Draft-Akonjang-ALTO-PROXIDOR-00.txt. Internet Engineering Task Force. IETF; Standardworkingdraft, Internet Society (ISOC) 4, Rue Des Falaises CH-1205 Geneva. Switzerland. Mar. 2, 2009.

\* cited by examiner

Enhanced ALTO concept for CDN

Problem of DNS based CDN query

METHOD FOR ACCESSING CONTENT IN NETWORKS AND A CORRESPONDING SYSTEM

BACKGROUND OF THE INVENTION

1. Field of the Invention

The present invention relates to a method for accessing content in networks, preferably in wide area networks, a corresponding system and uses of the method and/or the system.

2. Description of the Related Art

Content delivery networks (CDNs) are used to store content and to provide or give access to that content for a user. The content delivery networks are usually connected to the Internet and provide for example mirrored content on different proxy servers preferably in different locations worldwide. For example a company having branches in different countries or at least on different continents provides regional adapted software-updates on proxies or servers mirroring or caching the software-update which are each located on the different continents. A user may request the software-update of company abcde for download in a version 1.0 by specifying a resource identifier for example in form of a hostname www.abcde.de/software-update/V1. The hostname is then usually transmitted to a server for resolving a unique hosting server identifier corresponding to the hostname, so that a client may download the software-update.

To provide a most suitable download of the software-update for a user, the location of the user may be taken into account when resolving the hosting server identifier in form of an IP-address: If a user for example is located in Germany the IP-address to the German proxy server or European proxy server is provided for the hostname otherwise smaller data transfer rates and unnecessary traffic is produced: If the IP-address of a proxy server in China hosting the software-update were to be provided to the user located in Germany the data transfer rate would be smaller compared to the data transfer rate of a German proxy server due to the "bottleneck" of interconnection points of the Internet.

The current content delivery networks are usually based on domain name resolution of hostnames via DNS to point a user to a most suitable server for accessing or download requested content: For example when the company has a plurality of proxy servers each hosting or mirroring the content, these proxies are all assigned to the hostname by specifying DNS aliases, so-called CNAMES, to the public resource name respectively the hostname. Each CNAME corresponds to one proxy server of the content delivery network.

When a user therefore requests www.abcde.de/software-update/V1 the user location may taken into account by a cache selection logic via the IP-address from which the DNS request, i.e. the request for accessing www.abcde.de/software-update/V1, was transmitted.

The domain name system is structured hierarchically, i.e. that virtual higher layers of the hierarchy "see" only the IP-address of the requesting or handling DNS server but not for example the client's IP address. That might result in a non-optimal IP-address resolving for the user: If the user located in Germany requests www.abcde.de/software-update/V1 a DNS-server for example located in France is requested for resolving the IP-address for the requested hostname. The DNS-server then tries to resolve the IP-address for the specified hostname. However the DNS-server might have to contact a CDN-DNS-server in Spain of a content delivery network for resolving the IP-address. The CDN-DNS-Server receives the specified hostname to be resolved and the IP-address of the DNS-server but not the IP-address of the client. The IP-address of the most suitable server according to a cache selection logic is then a proxy server in France hosting the requested content. The client receives via the DNS-server the IP-address of a proxy in France for the hostname www.abcde.de/software-update/V1. However a proxy server in Germany would have been more suitable for download usually providing higher data transfer rates.

Since there exist a variety of free and popular DNS-servers, located worldwide this adds to the above mentioned non-optimal selection of proxies.

To overcome this drawback it was proposed to modify the DNS protocol for resolving IP-addresses of hostnames by adding the client's IP-address to the DNS-protocol, respectively the initial IP-address of the IP-resolving request, or by adding at least a sub-network identification information to allow identification of the region of the user to enhance IP-address resolution and enhanced guiding of the user to a more suitable server for download.

These modifications are however cost-intensive, since all DNS-servers have to be provided with such a modification. If in the whole chain of IP-address resolving requests only one DNS-server is not equipped with the above-mentioned modification of the DNS protocol the information about the client's IP address is lost for the other DNS-servers leading again to non-optimal resolution of the IP-address.

Another problem is privacy protection of the user: If the client's user IP-address is transmitted for determining the location of the user, this enables potential sniffers or attackers to contact directly the user's computer and to try to access personal data of the user like passwords, documents, emails or the like.

BRIEF SUMMARY OF THE INVENTION

It is therefore an object of the present invention to provide a method and a system for accessing content in content delivery networks which is cost-effective and allows a good grade of user privacy.

A further object of the present invention is to provide a method and a system for accessing content in content delivery networks which allows enhanced user guidance for accessing content.

It is further object of the present invention to provide a method and a system for accessing content in content delivery networks which allows an easy modification of existing guidance techniques, in particular DNS resolution of hostnames.

It is an even further object of the present invention to provide a method and a system for accessing content in content delivery networks which is interoperable to existing guidance techniques, in particular DNS resolution.

In accordance with the invention the aforementioned objects are accomplished by the method and the system according to the present invention.

According to the present invention, a method is provided for accessing content in networks, preferably in wide area networks, comprising the steps of Determining a resource for content by a resource identifier, Sending a DNS-query for resolving an IP-address for a host identifier specified as a part of the resource identifier by a client, Determining a preferred hosting server hosting the content according to the resource identifier, Sending a DNS-response comprising the IP-address of the determined hosting server to the client, Accessing the content from the determined hosting server by the client, and is characterized by the steps of providing at least one hosting server identifier or at least one IP-address corresponding to the resource identifier to a sorting server, sorting of the at least one hosting server identifier or at least one IP-address by the sorting server according to client specific information or according to network guiding information provided by the client, determining a preferred hosting server according to the sorted at least one hosting server identifier or at least one IP-address.

According to the present invention, a system is provided for accessing content in networks, preferably in wide area networks and preferably for performing a method, the system comprising a client for download content from a resource in a network, specified by a resource identifier, a DNS-server for resolving an IP-address for the resource identifier, at least one hosting server hosting the content, and at least one sorting server, wherein the at least one sorting server is formed such to process hosting server identifiers or IP-addresses provided by the DNS-server, to provide a sorted list of hosting server identifiers or IP-addresses providing each the content according to client specific information or according to network guiding information to the DNS-Server, and wherein the DNS-Server is formed such to provide the IP-addresses corresponding to the sorted list of hosting server identifiers to the client for accessing the content.

According to the present invention, a use of an EAL TO-protocol comprising the ALTO-protocol and fully qualified domain names and/or resource identifiers in a network on at least one server and one client for accessing content is defined.

According to the present invention, a use of a system and/or a method according to the present invention for accessing electronic program content is defined.

According to the present invention, a use of a system and/or a method according to the present invention for accessing content in content delivery networks, preferably in a Software as a Service network or cloud computing network is defined.

According to the invention it has first been recognized that the sorting server provides enhanced network guiding information for the DNS-server and the client with a sorted list of hosting server identifiers alias to the resource identifier. This enables the client to access content on a hosting server, being the most suitable for the user.

According to the present invention it has been further first recognized that the data exchange or the contacting of the sorting server might be provided on different levels in the DNS-hierarchy providing flexibility and an easy implementation. It is for example possible to include a data exchange between a DNS-server and a first sorting server with an exchange of resource identifiers while other sorting servers do not support resource identifiers, like hostnames. Then an optimized guidance for content for a user is provided with the first sorting server whereas data exchange between the DNS-server and the other sorting server is performed by the previous non-optimized technique. Of course it has to be ensured that an already optimized list of hosting server identifiers is not altered by sorting servers performing a non-optimized sorting technique.

One of the further advantages of the present invention is that a plurality of DNS-servers, for example restricted-access DNS servers of internet providers as well as open DNS servers located worldwide could be used without loosing effective and reliable guiding of the user to access a most suitable content on a hosting server.

Client specific information or network guiding information may simply include local and/or regional location information of the client. It may also include further specified information, preferably network preference information, like download or upload capacity or may include user-specific information like properties of the content to be accessed, for example threshold for a resolution of pictures as content. Client specific information may be provided by the client itself and/or by the network entities such as the DNS server.

According to a preferred embodiment the client and/or the DNS-server and/or the sorting server uses an EALTO-protocol for transmitting network guiding information, wherein the EALTO-protocol comprises the ALTO-protocol and fully qualified domain names and/or resource identifiers. This provides an easy and effective data exchange, in particular between the DNS-server and the sorting server. The use of the EALTO-protocol is also cost-effective since only few amendments or additional ALTO-protocol items are necessary for the EALTO-protocol.

According to a further preferred embodiment the method ranking of the at least one hosting server identifier or at least one IP-address, by the sorting server according to at least one preference policy is performed. A preference policy further provides enhanced guidance of a user when accessing content. Such a preference policy might be based not only on information about a user's location but may also include network based information like current network load characteristics or for example user-specific information like premium access to certain hosting servers.

According to a further preferred embodiment the ranking step includes reducing and/or discarding a number of hosting server identifiers and/or IP-addresses. This minimizes data transmission between the DNS-Server and the sorting server and/or the client. Furthermore lesser memory capacity and processing time is needed in the servers and the client when performing the ranking step.

According to a further preferred embodiment of the present invention the ranking step includes an ordering and/or reordering of the at least one hosting server identifier and/or at least one IP-address. This enables for example not only a ranking of hosting server identifiers but also a reranking or reordering. If for example a first sorting server contacted by a first DNS-server provides a first ranked list of hosting server identifiers, a second DNS-server might contact a second sorting server which reranks the transmitted first ranked list of hosting server identifiers for example when the second DNS-server includes in his query further or other location information of a user's location as network guiding information.

According to a further preferred embodiment the client and/or the DNS-server provides the at least one preference policy for the sorting server. This enables for example a user to specify his preference for content as network guiding information: A user might specify that for example content has to be accessed with a preferably low round trip time, when content is accessed by a virtual private network. A user might further specify a high download rate, so that content requested by the user is accessed and downloaded in the shortest possible time period. It is also possible that the DNS-server is provided with a predetermined preference policy and this preference policy is transmitted to the sorting server when requesting the sorting server for sorting of hosting server identifiers.

According to a further preferred embodiment the at least one preference policy includes a definition of equivalent content. This provides an even better guidance for a user to the most suitable content: Two different pieces of content might be determined as equivalent if for example the content is specified as a movie and the resolution of the movie exceeds a user determined threshold. A user might specify equivalent content in the client and the client generates a corresponding preference policy. The client then queries the DNS-server for determining an IP-address for a content resource identifier of a specific content and transmits the preference policy to the DNS-server. The DNS-server might then further transmit the preference policy to the sorting server for sorting and ranking according to the transmitted preference policy. This enhances greatly the flexibility and potential options of the method for a user.

According to a further preferred embodiment the at least one preference policy includes at least one preference parameter, wherein the at least one preference parameter is defined as network awareness parameter, in particular including load characteristics of hosting servers, cost matrices of peering points, network round trip times and/or customer contract information. This enables a great variety of information which could be implemented for ranking the hosting server identifiers by the sorting server and includes in general not only network related information, like round trip times or download- and/or upload-capacity, or response times but also user related information like preferences about downloading cost, access information for certain hosting servers or the like.

According to a further preferred embodiment a plurality of hosting server identifiers and/or IP-addresses is provided and sorted by the sorting server. This provides an enhanced quality of selection of hosting server identifiers for accessing content specified by a user. If for example a first DNS-server only provides one first hosting server identifier a second DNS-server might be contacted which then contacts a second sorting server. The second sorting server might add second hosting server identifiers and rank the first and second hosting server identifiers, so that a plurality of hosting server identifiers is provided resulting in an enhanced selection quality for the user querying an access to a specific content in a content delivery network.

According to a further preferred embodiment the at least one hosting server identifier or at least one IP-address and the preferred hosting server according to the sorted at least one hosting server identifier or at least one IP-address is temporarily stored in the DNS-server and/or the client and/or comprises a time-dependant validity. This provides an optimum between fast response times due to DNS-requests of the client and changes concerning the requested content on the hosting servers: For example the hosting server might provide lower data exchange rates in later times or the content has been cancelled from the preferred hosting server, etc. The timespan for storing the preferred hosting server identifier might be provided internally by the provider hosting the DNS-server for the DNS-server or the client might internally specify a time-span for requerying the DNS-server for rechecking the hosting server identifier for the preferred hosting server.

According to a further preferred embodiment DNS Resource Records and/or the DNSSEC Resource Records SIG are reordered or altered according to sorted hosting server identifiers or IP-addresses. This ensures compatibility to the existing DNS- and DNSSEC-protocols, therefore providing an easy upgrade and implementation, in particular of fully qualified domain names in the ALTO-protocol resulting in the EALTO-protocol.

According to the system according to the present invention, at least two of the sorting server, DNS-Server and/or the at least one hosting server are located in at least two different networks where DNS-Servers treat DNS-Servers located in different networks as clients requesting hosting server identifier resolution. This enhances the provision of content requested by a user enabling the user to access content not only on hosting servers within its own network but also in other networks.

According to the system according to the present invention, at least one of the client, the sorting server and/or the DNS-server uses an EALTO-protocol for transmitting network guiding information, wherein the EALTO-protocol comprises the ALTO-protocol and fully qualified domain names and/or resource identifiers. This provides an easy and effective data exchange for network guiding information, in particular between the DNS-server and the sorting server. The use of the EALTO-protocol is also cost-effective since only few amendments or additional ALTO-protocol items are essential for the EALTO-protocol.

According to a further preferred embodiment of the system, the DNS-server comprises a cache for caching sorting information of the at least one sorting server, preferably at least a ranked sorted list of hosting server identifiers. This provides a fast response for a user when requesting the same content and minimizes also network traffic.

According to a further preferred embodiment of the system, the client is formed such to query at least one sorting server. This enables a client and therefore a user to make directly use of network guiding information: For example when the client is a multi-homed client, the client may request and receive network guiding information, in particular which hosting server to be contacted for accessing content, for the network interface to be used for access the requested content.

According to a further preferred embodiment of the system, the sorting server and the DNS-server are collocated. This provides a cost-effective and low-maintenance server for sorting and resolving resource identifiers.

BRIEF DESCRIPTION OF THE DRAWINGS

There are several ways how to design and further develop the teaching of the present invention in an advantageous way. To this end it is to be referred to the patent claims on the one hand and to the following explanation of preferred embodiments of the invention by way of example, illustrated by the drawing on the other hand. In connection with the explanation of the preferred embodiments of the invention by the aid of the drawing, generally preferred embodiments and further developments of the teaching will we explained. In the drawing

DETAILED DESCRIPTION OF THE PREFERRED EMBODIMENTS

Figure 2:
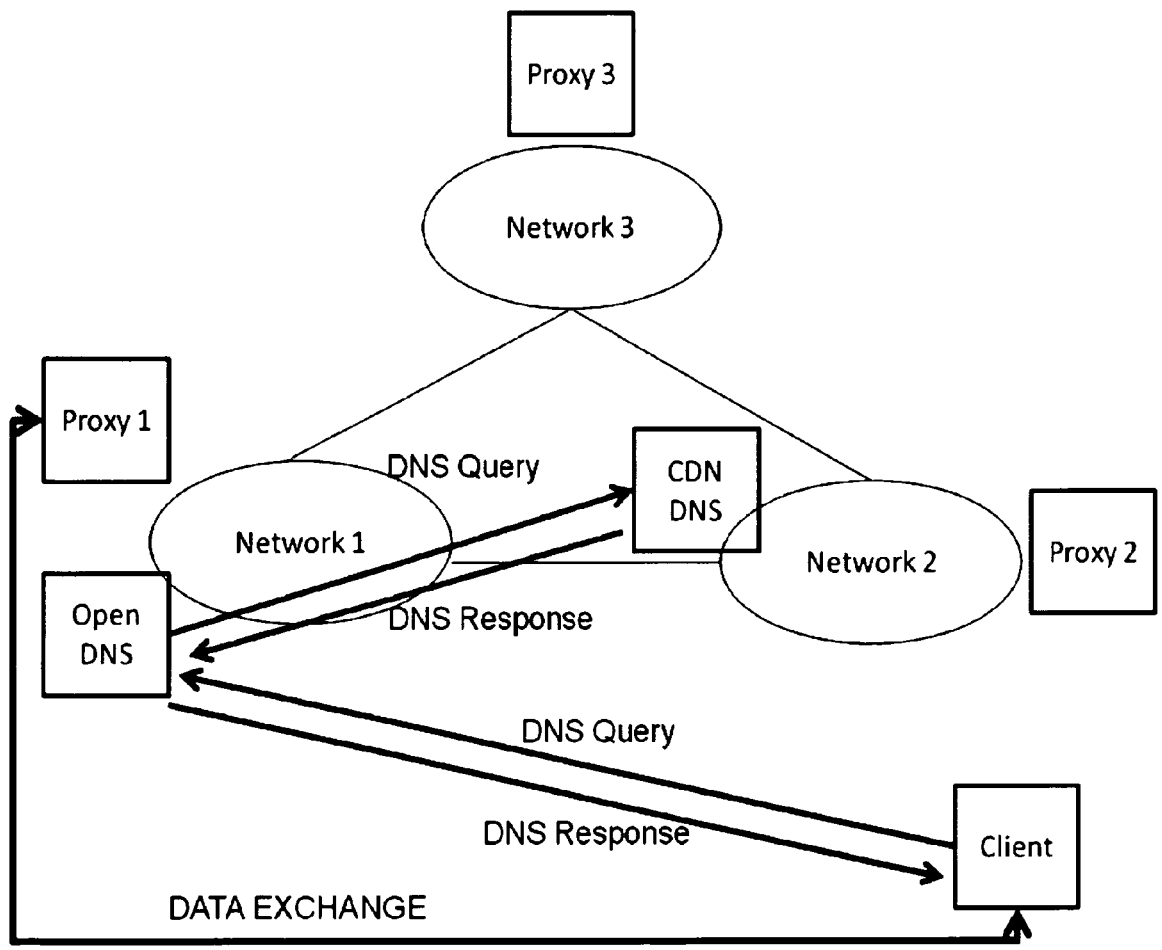

First a conventional system for accessing content in content delivery networks is described relating to FIG. 2.

In FIG. 2 a client with which a user can specify content to be accessed is located in a Network 2. A user enters for example a resource to be accessed by specifying a corresponding resource identifier "movie.bbc.co.uk" in the client. The client will send a DNS query to a preset DNS-server, in FIG. 2 an Open DNS server, located in a Network 1, which is different from Network 2. The Open DNS server will then try to resolve the DNS request of the client and will contact a content delivery network DNS-server (in the following:

CDN-DNS-server). The CDN-DNS-server stores hosting server addresses for three different proxies Proxy 1, 2 and 3 in corresponding networks 1,2 and 3 for serving customers locally, and which are in particular located in the respective same Network 1,2 or 3. Proxies 1, 2 and 3 each host the content requested by the client.

When receiving the DNS-request from the Open DNS-server, the CDN-DNS-server recognizes that the DNS-query for "movie.bbc.co.uk" originates from the Open DNS-server located in network 1 and will therefore answer the DNS-query of the Open DNS-server providing the hosting server identifier of Proxy 1 in Network 1, namely "proxy1.network1". The Open-DNS-server will transmit the hosting server identifier to the client, and in the following the client accesses the content hosted on hosting server Proxy 1, although hosting server Proxy 2 in network 2 would have been more suitable for accessing the content.

Figure 1:
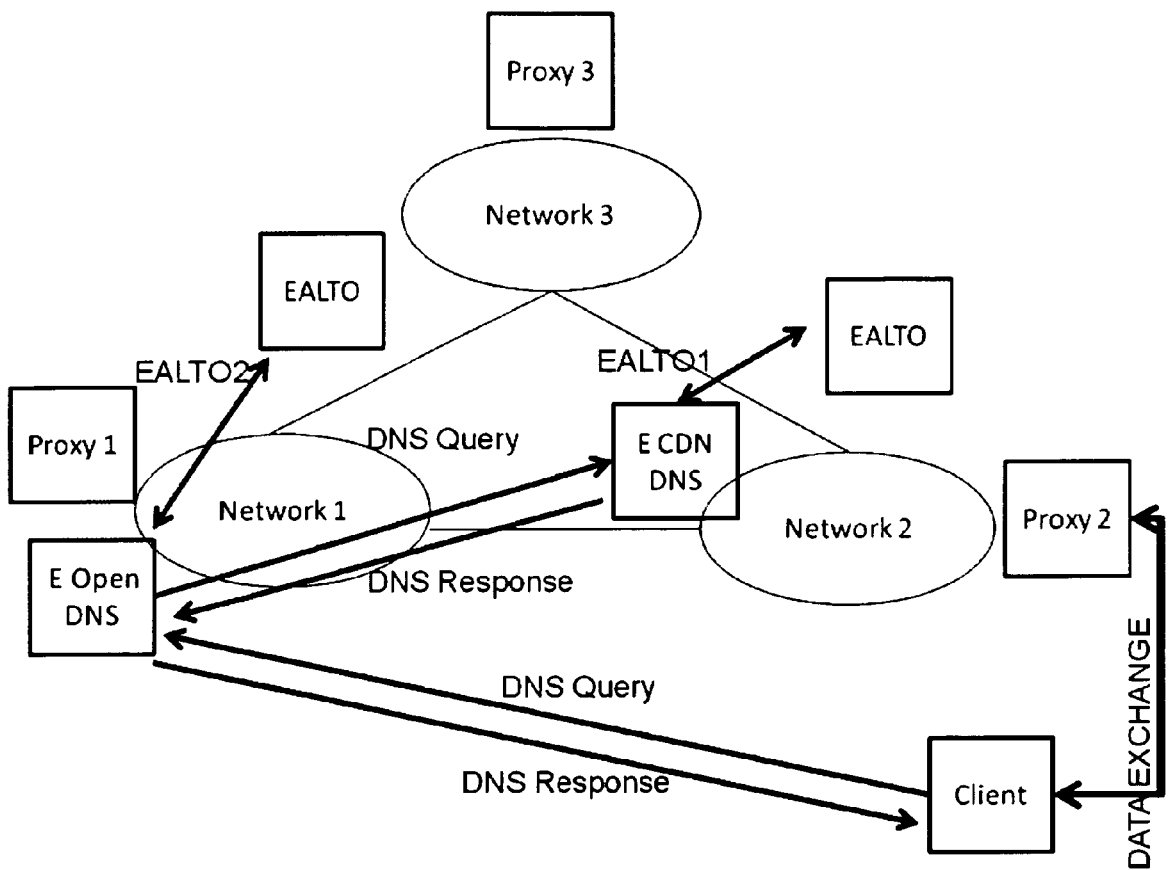
FIG. 1 is a schematical view of a system according to an embodiment of the present invention and FIG. 2 is a schematical view of a conventional system.

FIG. 1 shows a schematic view of a system according to an embodiment of the present invention.

In FIG. 1 in general shows a system according to FIG. 2. In contrast to FIG. 2, the Open-DNS-server, located in Network 1, and the CDN-DNS-server, located in network 2 are deployed with the EALTO-protocol, as well as the client, located in Network 2. They are referred with the prefix "E-", for example the CDN-DNS-server enabled to process the EALTO-protocol is named E-CDN-DNS-server.

When a user specifies in the E-client the resource identifier "movie.bbc.co.uk", the E-client sends a DNS-request for resolving the resource identifier to the E-Open-DNS-server. The E-Open-DNS-server will then try to resolve the DNS request of the E-client and will contact the E-CDN-DNS-server. The E-CDN-DNS-server stores hosting server addresses for three different proxies Proxy 1, 2 and 3 in corresponding networks 1,2 and 3 for serving customers locally, in particular located in the same corresponding Networks 1,2 and 3. Proxies 1,2 and 3 each host the content requested by the client.

The E-CDN-DNS-server will then compile a set of aliases indicating the three proxies Proxy 1, 2 and 3. Further in contrast to FIG. 2 the E-CDN-DNS-server contacts (reference sign EALTO1 in FIG. 1) a sorting server located in the network of the E-CDN-DNS-server, and capable of processing the EALTO-protocol. The sorting server in network 2 will respond with a sorted list or set of aliases for the resource identifier "movie.bcc.co.uk", for example with decreasing preference: "proxy1.network1", "proxy2.network2", and "proxy3.network3".

The E-CDN-DNS-server, located in Network 2 will return the sorted list to the E-Open-DNS-server, located in Network 1. The E-Open-DNS-server will receive the sorted list of the E-CDN-DNS-server and may now contact (reference sign EALTO2 in FIG. 1) itself a second sorting server also capable of processing the EALTO-protocol and located in the same network, namely network 1 as the E-Open-DNS-server for a reordering of the sorted list provided now by the E-Open-DNS-server. The E-Open-DNS-server indicates in its query for reordering that the original DNS-query from the E-client originates from a client in Network 2. Of course other location or preference information relating to the origin of the DNS-query may be provided by the E-Open-DNS-server for the second sorting server.

The second sorting server located in Network 1 will then reorder/resort the list to "proxy2.network2", "proxy1.network1", and "proxy3.network3" with decreasing preference. The reordered list or the indication thereof is transmitted to the E-Open-DNS-server. It is also possible that the E-Open-DNS-server discards all aliases for the resource identifier but with the highest preference. The E-Open-DNS-server will then send a DNS-response to the E-client indicating the hosting server "proxy2.network2" is the most suitable proxy for accessing the content by the client. The client will then contact "proxy2.network2" for data exchange, in particular accessing content.

In FIG. 1 there is therefore shown a network structure with two levels of the DNS hierarchy wherein each of the E-DNS-servers is able to query one or more sorting servers capable of processing the EALTO-protocol for the received DNS-query of the client.

The client might—as mentioned above—be an E-client with implemented EALTO-protocol and the E-client is capable of requesting an ordering in case of a retrieval of multiple aliases of resource identifiers of "movie.bbc.co.uk", for example through an electronic program guide.

A request for ordering or reordering of DNS Resource Records when querying DNS-servers or responding to a client may have to be reordered in correspondence with DNS-SEC Resource Records SIG to ensure compatibility. The Resource Records SIG entries in the DNS-protocol follow the corresponding Resource Records. The reordering of the DNS and DNSSEC Resource Records may be performed by or in one or more DNS-servers, like resolvers, name servers or the like based on the network guiding information. The DNS-servers may transmit the Resource Records and the Resource Records SIG to the sorting servers and receive back a transformed or reordered list reflecting the network guiding information.

The communication between the E-Open-DNS-Server or in general a E-DNS-Server and a sorting server capable of processing the EALTO-protocol may include a ranking request and the different E-DNS-servers on different DNS levels in the DNS hierarchy may reorder the resource identifiers, preferably symbolic names and/or IP addresses or the like according to a ranking information provided by the sorting server(s).

The system according to FIG. 1 also provides enhanced guidance for a user, for example in Software as a Service (SaaS) network models or "cloud" computing network models. In such a case the method and the system according to the invention allows optimized guidance on which proxy to use for a user when accessing the SaaS network. In the case of the SaaS network, for example Proxies 1, 2 and 3 of FIG. 1 offering a hosted version of office software and the content delivery network provides entry points for accessing the office software. When the client, for example an enterprise or firm, requests access to the office software the client may for example issue a DNS resolution request for "office.provider.com". The request is then handled according to FIG. 1 guiding the client in the end to the optimal Proxy 2 in network 2. In other words, in this cloud or SaaS setting the invention treats the Proxy identifiers as hosting server identifiers.

Of course protocols similar, analogue or in any way technically equivalent to the EALTO-protocol fall also under the term EALTO-protocol.

In summary one advantage of the invention is that in particular the EALTO-protocol may be deployed step by step in existing DNS network structures in the Internet and on different levels of the DNS hierarchy. A further advantage of the invention is that the system and the method provide an hierarchical improvement of assigned ordering of aliases for a requested resource identifier, even if Open-DNS-Servers are used. A further advantage is an enhancement of the existing ALTO-protocol to the EALTO protocol, including hostnames, full qualified domain names or resource identifiers. Even further advantages are, that the invention provides an improved efficiency when using content delivery networks avoiding the drawback concerning Open-DNS-servers, that the hierarchical structure of the DNS resolution can be used, that a step-by-step-upgrade on existing deployments in the Internet is possible, that it is transparent to non-improved DNS servers and/or clients and that the invention is DNSSEC compatible.

The invention further allows an incorporation of network guiding information for content delivery networks for a content delivery network server selection in the domain name system through reordering DNS information accordingly and allows therefore a refinement of the domain name system based on network guiding information.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for accessing content in wide area networks, comprising:
    determining a resource for content by a resource identifier;
    sending a Domain Name System (DNS)-query for resolving an IP-address for a host identifier specified as a part of the resource identifier by a client to a DNS-server;
    determining a preferred hosting server hosting the content according to the resource identifier by the DNS-server;
    sending a DNS-response comprising the IP-address of the determined hosting server to the client by the DNS-server;
    accessing the content from the determined hosting server by the client;
    providing at least one hosting server identifier or at least one IP-address corresponding to the resource identifier to a sorting server by the DNS-server;
    sorting the at least one hosting server identifier or at least one IP-address by the sorting server according to client specific information or according to network guiding information provided by the client; and
    determining a preferred hosting server according to the sorted at least one hosting server identifier or at least one IP-address,
    wherein one or more of the client and the sorting server include one or more processors configured to perform the respective accessing and sorting, and
    for the sorting, a ranking is performed of the at least one hosting server identifier or at least one IP-address by the sorting server according to at least one preference policy, the client providing the at least one preference policy for the sorting server, the at least one preference policy including a definition of equivalent content.

2. The method according to claim 1, wherein the client and/or the DNS-server and/or the sorting server uses an E-Application-Layer Traffic Optimization (EALTO)-protocol for transmitting network guiding information, the EALTO-protocol comprising the ALTO-protocol and fully qualified domain names and/or resource identifiers.

3. The method according to claim 2, wherein ranking is performed of the at least one hosting server identifier or at least one IP-address by the sorting server according to at least one preference policy.

4. The method according to claim 1, wherein the ranking includes reducing and/or discarding a number of hosting server identifiers and/or IP-addresses.

5. The method according to claim 4, wherein the ranking includes an ordering and/or reordering of the at least one hosting server identifier or at least one IP-address.

6. The method according to claim 4, wherein the client and/or the DNS-server provides the at least one preference policy for the sorting server.

7. The method according to claim 1, wherein the ranking includes an ordering and/or reordering of the at least one hosting server identifier or at least one IP-address.

8. The method according to claim 1, wherein the DNS-server additionally provides a preference policy.

9. The method according to claim 1, wherein the at least one preference policy includes at least one preference parameter,
    wherein the at least one preference parameter is defined as network awareness parameter, including load characteristics of hosting servers, cost matrices of peering points, network round trip times and/or customer contract information.

10. The method according to claim 1, wherein a plurality of hosting server identifiers and/or IP-addresses is provided and sorted by the sorting server.

11. The method according to claim 1, wherein the at least one hosting server identifier or at least one IP-address and the preferred hosting server according to the sorted at least one hosting server identifier or at least one IP-address is temporarily stored in the DNS-server and/or the client and/or comprises a time-dependant validity.

12. The method according to claim 1, wherein DNS Resource Records and/or DNSSEC Resource Records SIG are reordered or altered according to sorted hosting server identifiers or IP-addresses.

13. A system for accessing content in wide area networks and for performing the method according to claim 1, the system comprising:
    a client configured to download content from a resource in a network, specified by a resource identifier;
    a DNS-server for resolving an IP-address for the resource identifier;
    at least one hosting server hosting the content; and
    at least one sorting server configured to process hosting server identifiers or IP-addresses provided by the DNS-server, to provide a sorted list of hosting server identifiers or IP-addresses providing each the content according to client specific information or according to network guiding information to the DNS-Server,
    wherein the DNS-Server is configured to provide the IP-addresses corresponding to the sorted list of hosting server identifiers to the client for accessing the content,
    one or more of the client and the sorting server include one or more processors configured to respectively perform the downloading and the sorting and a memory storing instructions to cause the one or more processors to perform the downloading and the sorting, and
    for providing the sorted list, a ranking is performed of the at least one hosting server identifier or at least one IP-address by the sorting server according to at least one preference policy, the client providing the at least one preference policy for the sorting server, the at least one preference policy including a definition of equivalent content.

14. The system according to claim 13, wherein at least two of the sorting server, the DNS-Server and/or the at least one hosting server are located in at least two different networks where DNS-Servers treat DNS-Servers located in different networks as clients requesting hosting server identifier resolution.

15. The system according to claim 13, wherein at least one of the client, the sorting server and/or the DNS-server uses E Application-Layer Traffic Optimization (EALTO)-protocol for transmitting network guiding information, the EALTO-protocol comprising the ALTO-protocol and fully qualified domain names (FQDNs) and/or resource identifiers.

16. The system according to claim 13, wherein the DNS-server comprises a cache sorting information of the at least one sorting server, the sorting information including at least a ranked sorted list of hosting server identifiers.

17. The system according to claim 13, wherein the client is configured to query at least one sorting server.

18. The system according to claim 13, wherein the sorting server and the DNS-server are collocated.

* * * * *